(12) United States Patent
Kollar et al.

(10) Patent No.: US 9,383,042 B2
(45) Date of Patent: Jul. 5, 2016

(54) TANK AND SPOUT INTERFACE FOR HEAT EXCHANGER AND ITS MANUFACTURING

(71) Applicant: VISTEON GLOBAL TECHNOLOGIES, INC., Van Buren Township, MI (US)

(72) Inventors: Ján Gregus Kollar, Skalica (SK); Hynek Hruza, Novy Jicin (CZ)

(73) Assignee: Hanon Systems, Daejeon-si (KR)

( * ) Notice: Subject to any disclaimer, the term of this patent is extended or adjusted under 35 U.S.C. 154(b) by 96 days.

(21) Appl. No.: 13/853,151

(22) Filed: Mar. 29, 2013

(65) Prior Publication Data
US 2013/0257040 A1 Oct. 3, 2013

(30) Foreign Application Priority Data

Mar. 30, 2012 (CS) ...................................... 2012-224

(51) Int. Cl.
| | | |
|---|---|---|
| *F28F 9/00* | (2006.01) | |
| *F16L 5/00* | (2006.01) | |
| *F28F 9/02* | (2006.01) | |

(52) U.S. Cl.
CPC ................ *F16L 5/00* (2013.01); *F28F 9/0263* (2013.01); *F28F 9/0265* (2013.01)

(58) Field of Classification Search
CPC ...... F28F 9/0268; F28F 9/0265; F28F 9/0263
USPC ........ 285/192, 242, 219; 138/37, 38; 165/174
See application file for complete search history.

(56) References Cited

U.S. PATENT DOCUMENTS

| | | | | | |
|---|---|---|---|---|---|
| 1,730,453 | A | * | 10/1929 | Devon .......................... | 48/189.4 |
| 1,877,567 | A | * | 9/1932 | Erbes ................................. | 138/37 |
| 1,915,805 | A | * | 6/1933 | Sutcliffe ......................... | 165/137 |
| 2,628,079 | A | * | 2/1953 | Haynes ................. | F28F 9/0217 |
| | | | | | 165/104.32 |
| 5,284,203 | A | * | 2/1994 | Dauvergne .................... | 165/174 |
| 5,351,751 | A | | 10/1994 | Cage et al. | |
| 6,006,825 | A | | 12/1999 | Kitazaki | |
| 2001/0017201 | A1 | * | 8/2001 | Avequin et al. ................ | 165/173 |
| 2007/0079957 | A1 | * | 4/2007 | Tomura .......................... | 165/174 |

(Continued)

FOREIGN PATENT DOCUMENTS

| | | | |
|---|---|---|---|
| FR | 1291617 | * | 4/1962 |
| JP | 09126682 A | | 5/1997 |

(Continued)

*Primary Examiner* — David E Bochna
*Assistant Examiner* — James Linford
(74) *Attorney, Agent, or Firm* — Fraser Clemens Martin & Miller LLC; James D. Miller

(57) ABSTRACT

A tank and spout interface of a radiator of a motor vehicle having a tank part having an inner surface, an outer surface, a connecting part, a bottom portion, a first end, a second end, a first outer margin, and a second outer margin. The tank and spout interface has a connection sleeve disposed on the tank part and extending outwardly from the tank part having an inner surface integrally formed with the inner surface of the first outer margin of the tank part and an outer surface integrally formed with the outer surface of the tank part. A first entry riser and a second entry riser are disposed on opposing sides of the inner surface of the connection sleeve and a first internal riser and a second internal riser are disposed on the first outer margin of the tank part.

11 Claims, 3 Drawing Sheets

(56) References Cited

U.S. PATENT DOCUMENTS

2007/0187080 A1* 8/2007 Sonoda et al. ............... 165/174
2009/0126917 A1* 5/2009 Sannohe ...................... 165/151
2011/0168364 A1   7/2011 Okuyama et al.
2014/0182826 A1* 7/2014 Goenka ........................ 165/174

FOREIGN PATENT DOCUMENTS

| JP | 09257390 A  |   | 10/1997 |
|----|-------------|---|---------|
| JP | 2938335     | * | 6/1999  |
| JP | 2000180088 A |   | 6/2000  |
| JP | 2009150572 A |   | 7/2009  |

* cited by examiner

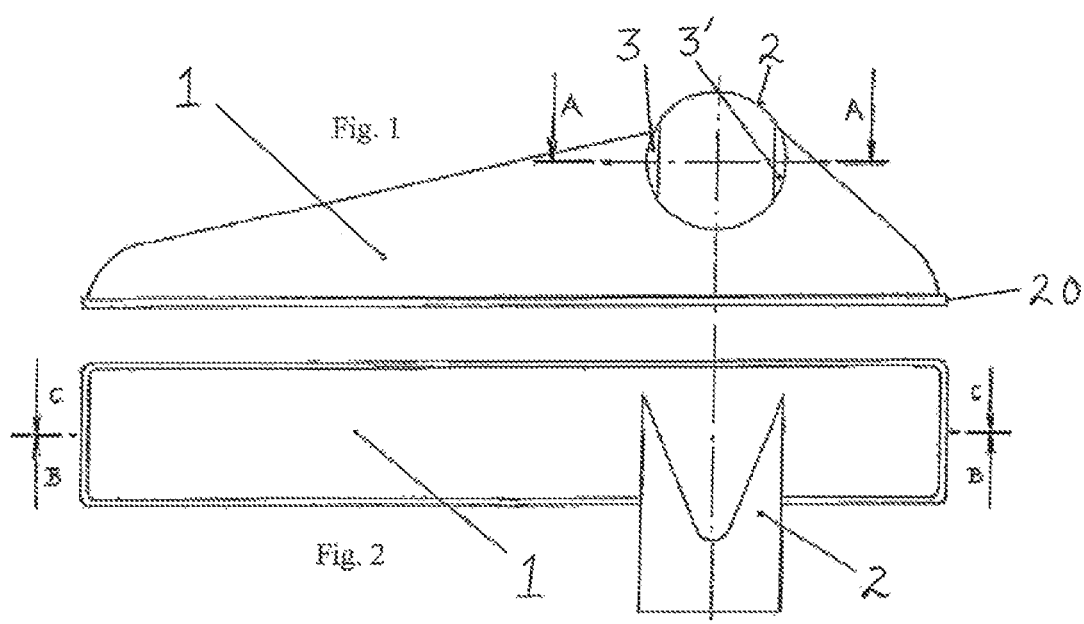

TANK AND SPOUT INTERFACE FOR HEAT EXCHANGER AND ITS MANUFACTURING

CROSS-REFERENCE TO RELATED APPLICATION

This application claims priority to Czech Republic Patent Application Serial No. PV 2012-224 filed on Mar. 30, 2012, hereby incorporated herein by reference in its entirety.

FIELD OF THE INVENTION

The present disclosure relates to a connecting part of a radiator, specifically a radiator of a motor vehicle.

BACKGROUND OF THE INVENTION

This section provides background information related to the present disclosure which is not necessarily prior art. The connecting parts that are known for radiators of motor vehicles are formed by a plastic tank part. The plastic tank part has a width and length corresponding to the width and height of the radiator. Provided at the bottom of the tank part is a connection sleeve to supply and take away the operating fluid emerging into the internal space of the tank part.

The drawback of these known connecting parts is that a pressure drop of the operating fluid occurs in them, which substantially influences the overall performance of the heat exchanger. The pressure drop in the operating fluid occurs especially in the region of sharp edges where the inner wall of the connection sleeve passes into the wall of the tank part (and vice versa) and which are created during the manufacture of the plastic connecting part by injection molding.

SUMMARY OF THE INVENTION

The aforementioned drawback is eliminated by a connecting part of a radiator according to this invention. The problem is solved in that the connection sleeve has two parallel rounded longitudinal entry risers arranged at the places of its transition to the inner wall of the tank part. The entry risers having an opposite orientation to each other. Each entry riser is an integral part of the wall riser on either side, of which the first wall riser is adjacent to the end face of the tank part closest to the connection sleeve and the second wall riser is adjacent to the end face of the tank part furthest away from the connection sleeve. Each of these wall risers on the one hand is continuously joined by the surface away from the outer margin of the tank part to the bottom surface of the connecting part of the radiator and on the other hand has rounded edges facing away from the bottom of the connecting part of the radiator. The wall risers are arranged at the same distance from the outer margin of the tank part as the distance of the transition of the part of the inner wall of the connection sleeve adjacent to the outer margin of the tank part from the outer margin of the tank part of the connecting part.

The inner wall of the tank part opposite the connection sleeve is provided with two end risers situated at a spacing from each other. The two end risers of the tank are in the form of straight ribs oriented by their longitudinal axes perpendicular to the outer margin of the tank part. Between the two end risers is arranged a partition joining the two opposite inner walls of the tank part of the connecting part of the radiator.

Next to each end riser there is arranged a straight longitudinal riser on the inner wall of the tank part directed toward each end face of the tank part. Next to the longitudinal riser there are arranged at least two, but preferably three, identically oriented control risers on the inner wall of the tank part directed toward the end face of the tank part furthest away from the connection sleeve.

Advantageously, next to the second wall riser, at least two, but preferably three, straight longitudinal guide risers are arranged perpendicular to the outer margin of the tank part on the inner wall of the tank part and directed toward the end face of the tank part furthest away from the connection sleeve.

Additionally advantageous, the control risers and longitudinal guide risers have a cross section in the shape of a circular section. The height of the circular sections of the control and guide risers gradually decreases with increasing distance of the risers from the partition.

It must also be considered advantageous that the longitudinal guide risers on the inner wall of the tank part are arranged opposite spaces situated between the control risers formed on the opposite inner wall of the tank part.

The tank part advantageously has lengthwise cross-sectional shape of an obtuse-angled triangle. The connection sleeve is situated transversely in the region of the line connecting the two legs of the obtuse-angled triangle.

According to an embodiment, the first wall riser has essentially the shape of an equilateral right triangle arranged with one of its legs parallel to the outer margin of the tank part where its surface is parallel to the load-bearing inner wall of the tank part or makes an acute angle with it. The second wall riser has the shape essentially of a quadrangle with one angle of 90° situated as the mirror image of the right angle of the triangular first inner riser on the other side of the connection sleeve.

It is also advantageous that the surface of the wall riser is parallel to the load-bearing inner wall of the tank part or makes an acute angle with it open toward the bottom surface of the connecting part of the radiator. The straight longitudinal riser has in cross section the shape of a circular section and is oriented perpendicular to the outer margin of the tank part and that the entry risers are situated perpendicular to the outer margin of the tank part.

The advantage of the connecting part of a radiator is, in particular, that it has no sharp edges in places of the transition of the inner wall of the connection sleeve to the wall of the tank part (or vice versa) so that no substantial pressure drop occurs in the fluid, which results in greater efficiency of the entire cooling mechanism. By creating risers having in cross section the shape of a circular section on the inner walls of the tank part and by having them in staggered arrangement, one achieves both an ideal flow pattern of the fluid and also a greater flow rate.

BRIEF DESCRIPTION OF THE DRAWINGS

An example of a possible specific embodiment of the connecting part of a radiator according to the invention is shown in the enclosed drawings, where:

FIG. 1 illustrates a front view of the connecting part of a radiator;

FIG. 2 illustrates a plan view of the connecting part of the radiator;

DETAILED DESCRIPTION OF EXEMPLARY EMBODIMENTS OF THE INVENTION

Figure 3:
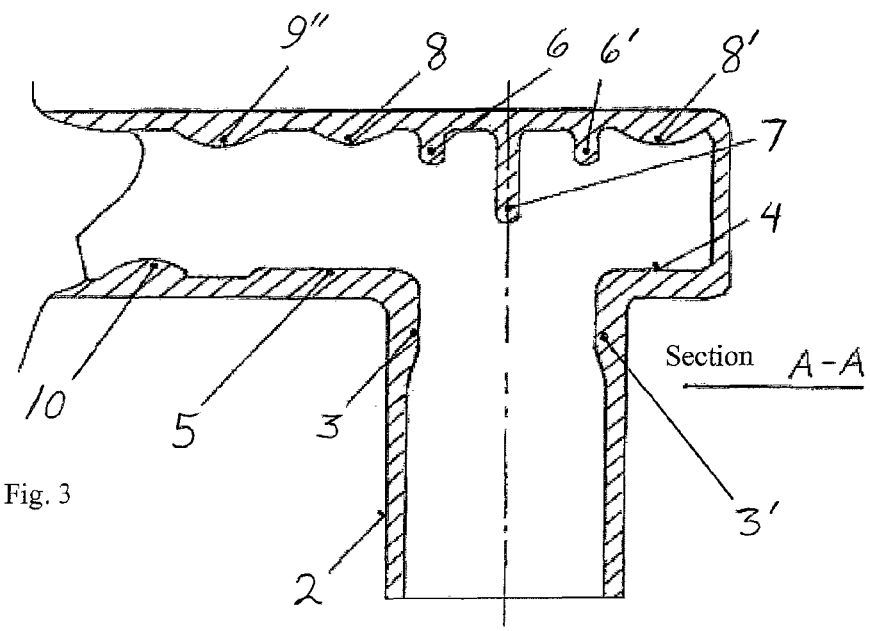
FIG. 3 illustrates a cross-sectional view A-A of FIG. 1 on an enlarged scale.
Figure 4:
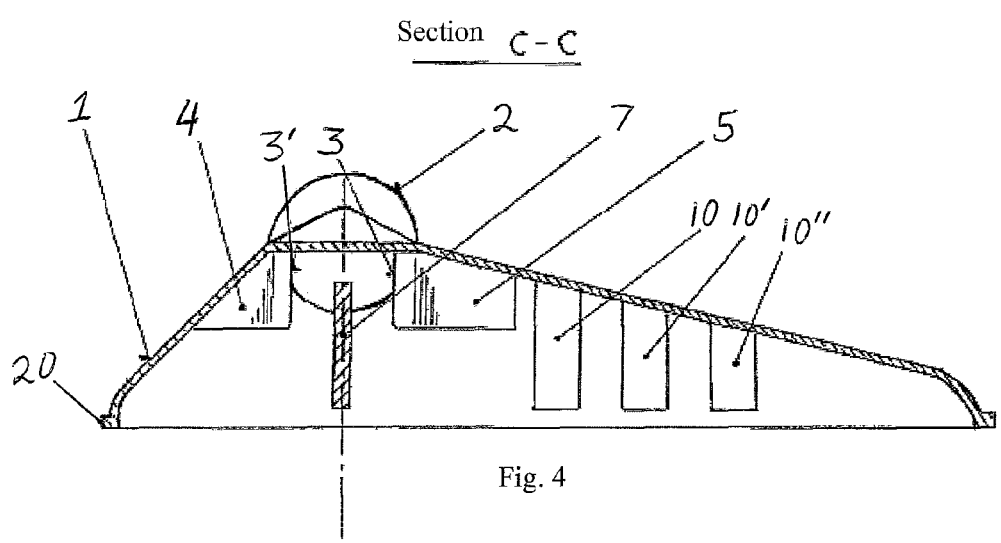
FIG. 4 illustrates a cross-sectional view C-C of FIG. 2.

The following detailed description and appended drawings describe and illustrate various exemplary embodiments of the invention. The description and drawings serve to enable one skilled in the art to make and use the invention, and are not intended to limit the scope of the invention in any manner.

As can be seen from FIG. 1, the connecting part of a radiator according to this invention consists of a tank part 1, which is provided with a connection sleeve 2. The tank part 1 having in lengthwise section the shape of an obtuse-angled triangle. The connection sleeve 2 situated transversely in the region of the connecting line of the two legs of the obtuse-angled triangle has, situated at the places of its transition to the internal space of the tank part 1, two rounded longitudinal entry risers 3, 3' narrowing the internal cross section of the connection sleeve 2. These longitudinal entry risers 3, 3' oriented opposite each other and perpendicular to the outer margin of the tank part 1, are an integral part of the wall riser 4, 5 on both sides of the connection sleeve 2 (see FIG. 3). A bottom portion 20 of the tank part 1 is formed opposite the region of the connecting line of the two legs of the obtuse-angled triangle having the connection sleeve 2 extending transversely therefrom.

The first wall riser 4, adjacent to the end face of the tank part 1 closest to the connection sleeve 2, has essentially the shape of an equilateral right triangle, situated with one of its legs parallel to the outer margin of the tank part 1. The second wall riser 5, adjacent to the end face of the tank part 1 furthest away from the connection sleeve 2, has essentially the shape of a quadrangle, with one angle of 90° situated as the mirror image of the right angle of the triangular first inner riser 4 on the opposite side of the mouth of the connection sleeve 2 to the tank part 1 of the connecting part of the radiator. Each of these wall risers 4, 5 is joined smoothly to the bottom surface of the connecting part of the radiator by its surface away from the outer margin of the tank part 1. Each of these risers has its rounded edges facing away from the bottom of the connecting part of the radiator arranged at the same distance from the outer margin of the tank part 1 as is the distance of the transition of the part of the inner wall of the connection sleeve 2 adjacent to the outer margin of the tank part 1 from the outer margin of the tank part 1 of the connecting part.

As is further evident from FIG. 3, the inner wall of the tank part 1 opposite the connection sleeve 2 is provided with two end risers 6, 6'. The two end risers 6, 6' are spaced apart from each other. The two end risers 6, 6' are in the form of straight ribs, oriented by their longitudinal axes perpendicular to the outer margin of the tank part 1. Between the end risers 6, 6' is arranged a partition 7 joining both opposite inner walls of the tank part 1 of the connecting part of the radiator.

Figure 5:
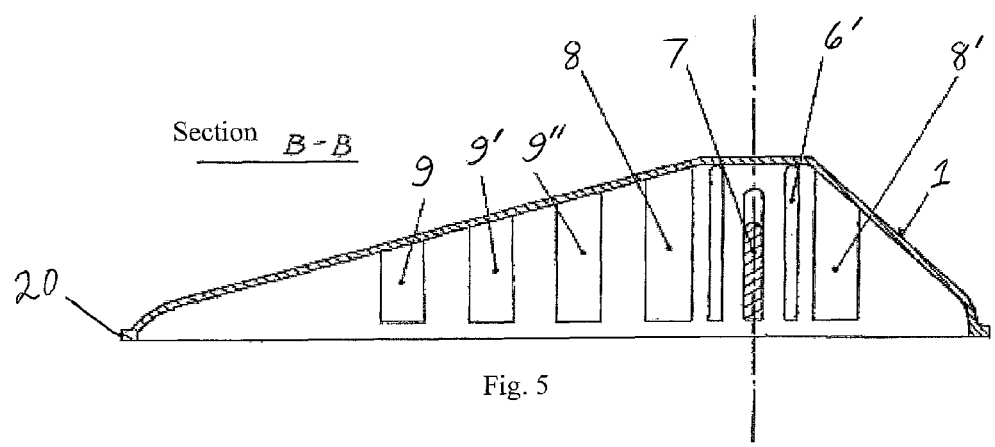
FIG. 5 illustrates a cross-sectional view B-B of FIG. 2.

Next to each end riser 6, 6' (see FIG. 3 and FIG. 5), and directed toward each end face of the tank part 1 is arranged a straight longitudinal riser 8, 8' on the inner wall of the tank part 1 perpendicular to its outer margin and having the shape of a circular section in cross section.

Next to the longitudinal riser 8 (see FIG. 5) on the inner wall of the tank part 1, and directed toward the end face of the tank part 1 furthest away from the connection sleeve 2, are arranged three identically oriented control risers 9, 9', 9" having likewise the shape of a circular section in cross section.

On the opposite wall of the tank part 1, next to the second wall riser 5 in the form of a quadrangle directed toward the end face of the tank part 1 that is furthest away from the connection sleeve 2, are arranged three straight longitudinal guide risers 10, 10', 10" perpendicular to the outer margin of the tank part 1. The longitudinal guide risers 10, 10', 10" having the shape of a circular section in cross section.

According to advantageous embodiment, the height of the circular sections of the control and guide risers 9, 9', 9", 10, 10', 10" gradually decrease with increasing distance of the individual risers 9, 9', 9", 10, 10', 10" from the partition 7. The longitudinal guide risers 10, 10', 10" are arranged on the inner wall of the tank part 1 opposite spaces arranged between the control risers 9, 9', 9" formed on the opposite inner wall of the tank part 1.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tank and spout interface of a radiator of a motor vehicle, comprising:
   a tank part having an inner surface, an outer surface, a bottom portion, a first end, a second end, a first outer margin, and a second outer margin;
   a connection sleeve having a central axis, the connection sleeve disposed on the tank part and extending outwardly from the tank part, the connection sleeve having an inner surface integrally formed with an inner surface of the first outer margin of the tank part and an outer surface integrally formed with the outer surface of the tank part;
   a first entry riser and a second entry riser disposed on opposing sides of the inner surface of the connection sleeve adjacent the first outer margin of the tank part;
   a first wall riser and a second wall riser disposed on the inner surface of the first outer margin of the tank part, the first wall riser integrally formed with the first entry riser and the second wall riser integrally formed with the second entry riser, the first wall riser and the second wall riser protruding from the inner surface of the tank part and extending towards the bottom portion;
   a first end riser and a second end riser disposed on the second outer margin of the tank part and a partition disposed intermediate the first end riser and the second end riser, wherein the first entry riser and the second entry riser respectively protrude inwardly in a radial direction of the connection sleeve for narrowing a flow passage of the connection sleeve, and wherein the partition is aligned with the central axis of the connection sleeve and protrudes from the second outer margin beyond the first end riser and the second end riser; and
   at least three guide risers equidistantly spaced apart from each other and disposed on the first outer margin intermediate the second wall riser and the second end of the tank part, wherein each of the guide risers has a height in a longitudinal direction thereof, the height of each of the guide risers decreasing with an increasing distance from the second wall riser; wherein the longitudinal direction of each of the guide risers is arranged perpendicular to the central axis of the connection sleeve, the central axis of the connection sleeve arranged substantially perpendicular to the first outer margin and the second outer margin and the connection sleeve located at a position on the tank part substantially opposite the bottom portion of the tank part.

2. The tank and spout interface of claim 1, further comprising a first longitudinal riser disposed on the second outer margin intermediate the first end and the first end riser and a second longitudinal riser disposed on the second outer margin intermediate the second end and the second end riser.

3. The tank and spout interface of claim 2, further comprising at least two control risers disposed on the second outer margin intermediate the second longitudinal riser and the second end.

4. The tank and spout interface of claim 3, wherein the control risers have a shape of a circular section in cross section.

5. The tank and spout interface of claim 3, wherein each of the control risers has a height, the height of each of the control risers decreasing with an increasing distance from the second longitudinal riser.

6. The tank and spout interface of claim 3, wherein the control risers have spaces disposed therebetween and the guide risers are disposed on the first outer margin opposing the spaces between the control risers.

7. The tank and spout interface of claim 2, further comprising at least three control risers disposed on the second outer margin intermediate the second longitudinal riser and the second end.

8. The tank and spout interface of claim 1, wherein the guide risers have a shape of a circular section in cross section.

9. The tank and spout interface of claim 1, wherein a lengthwise cross section of the tank part is substantially shaped as an obtuse triangle with a region connecting two legs of the obtuse triangle, the connection sleeve disposed in the region connecting the two legs of the obtuse triangle.

10. The tank and spout interface of claim 1, wherein the first wall riser has a shape of one of an isosceles right triangle and an acute triangle.

11. The tank and spout interface of claim 1, wherein the second wall riser has a shape of a quadrangle.

\* \* \* \* \*